Feb. 22, 1944.   O. P. CRIM   2,342,180
FEEDING TROUGH FOR LIVESTOCK
Filed Nov. 29, 1941   2 Sheets-Sheet 2
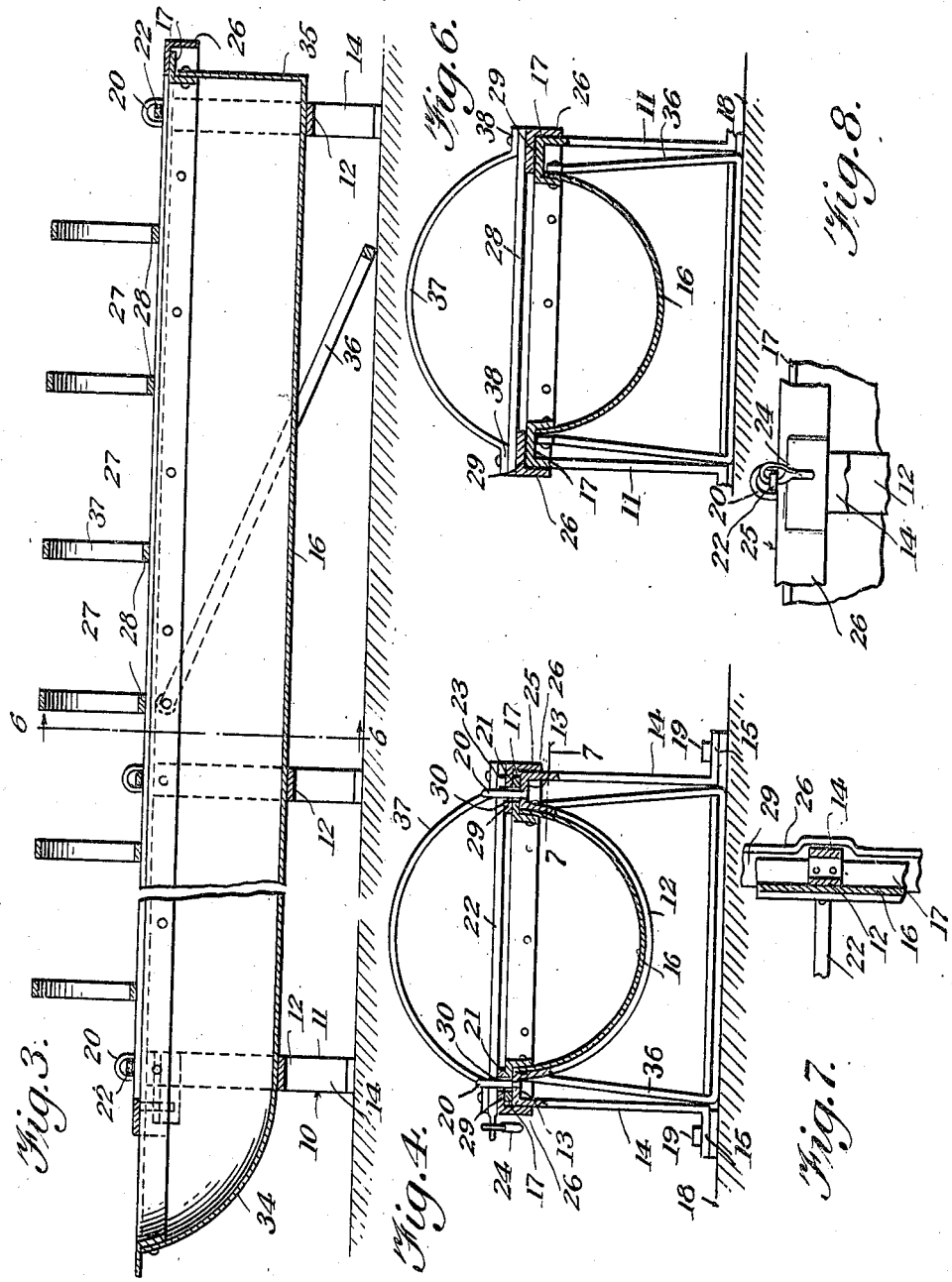
INVENTOR.
Otis P. Crim
BY
Victor J. Evans & Co.
ATTORNEYS Patented Feb. 22, 1944

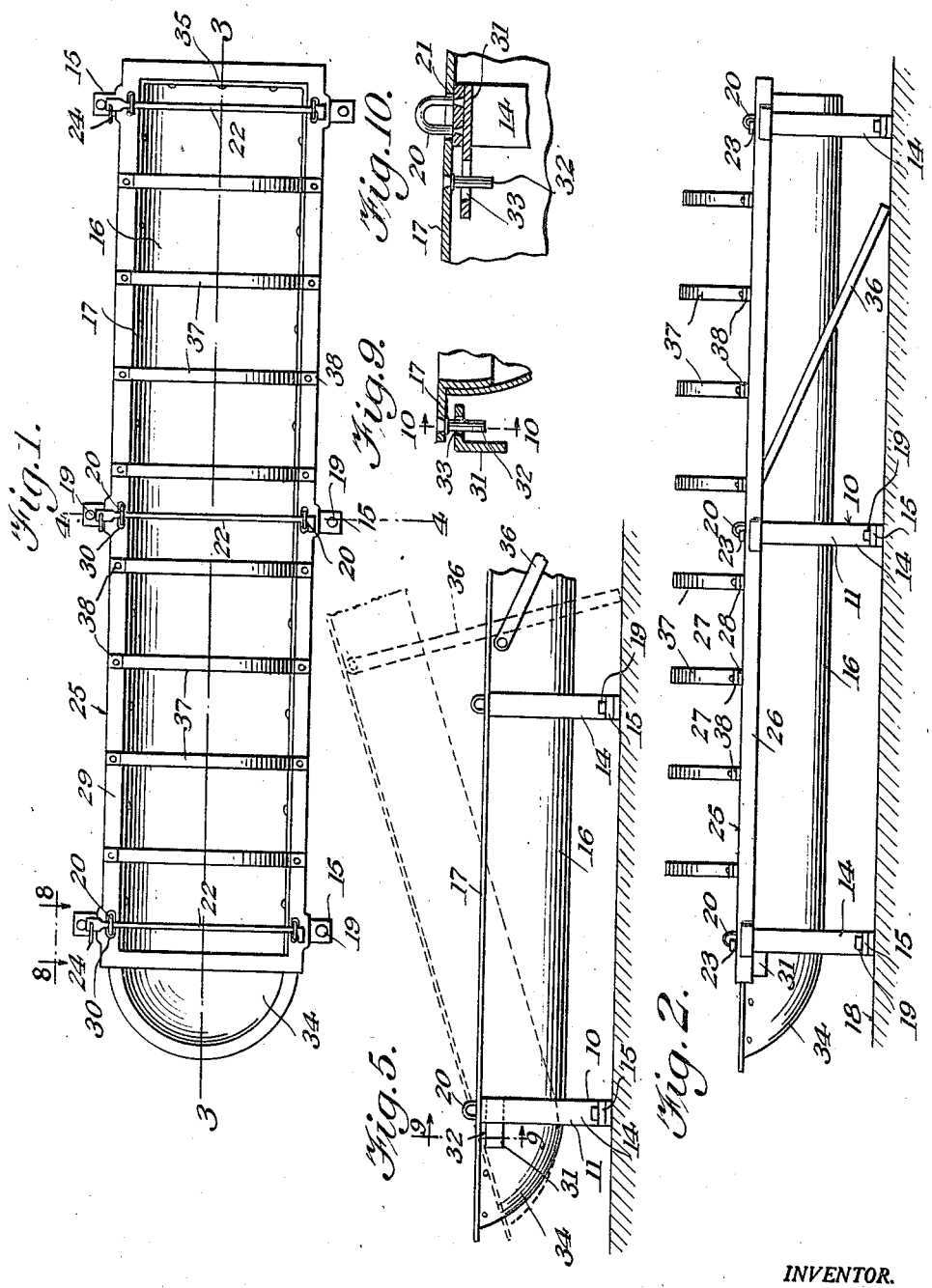

2,342,180

UNITED STATES PATENT OFFICE 2,342,180

FEEDING TROUGH FOR LIVESTOCK

Otis P. Crim, Anderson, Ind.

Application November 29, 1941, Serial No. 421,055

2 Claims. (Cl. 119—61)

My invention relates to new and useful improvements in feeding troughs for livestock.

An important object of my invention is the provision of a feeding trough that is particularly, though not exclusively, adapted to hogs, the arrangement being such that the animals feeding from the trough will be kept separate from each other and will be prevented from climbing bodily into the trough.

Another object of my invention is the provision of a device of the above mentioned character that may not be overturned by the animals feeding therefrom but which is movable or adjustable in its nature to permit the trough to be easily cleaned thereby providing a strong, durable and yet sanitary construction.

Other objects and advantages of my invention, will be apparent during the course of the following description.

In the drawings, forming a part of this specification, and wherein like numerals are employed to designate like parts throughout the same, Figure 1 is a top plan view of a device embodying my invention, Figure 2 is a side elevation thereof, Figure 3 is a vertical longitudinal sectional view taken on the line 3—3 of Figure 1, Figure 4 is a transverse vertical sectional view taken on the line 4—4 of Figure 1, Figure 5 is a fragmentary side elevation of my device and showing the same in both a horizontal and tilted position.

Figure 6 is a fragmentary transverse vertical sectional view taken on the line 6—6 of Figure 3, Figure 7 is a fragmentary longitudinal sectional view taken on the line 7—7 of Figure 4, Figure 8 is a fragmentary side elevation of the device looking in the direction of the arrows 8—8 of Figure 1, Figure 9 is a fragmentary transverse vertical sectional view taken on the line 9—9 of Figure 5, and Figure 10 is a fragmentary vertical longitudinal sectional view taken on the line 10—10 of Figure 9.

In the accompanying drawings, wherein for the purpose of illustration, is shown a preferred embodiment of my invention, the numeral 10 designates a supporting structure which comprises a plurality of aligned substantially equi-spaced supports 11. Each of the supports is identical in its construction and is preferably constructed from an elongated strip of metallic sheet or bar material. Each support is formed at substantially its middle with a depending semi-circular curved portion 12 having laterally extending horizontal ledges 13 formed at the opposite ends thereof and the ledges are formed at their outer ends with downwardly extending legs 14 which terminate in outwardly directed bases 15. As may be readily observed from the drawings, the several supports are arranged in spaced relation with each other and with the intermediate curved portions 12 in alignment to receive the semi-cylindrical feeding trough or tank 16. The intermediate curved portions of the supports snugly receive and conform to the curved portion of the trough and the opposite longitudinal edges of the trough are each formed with an outwardly extending lip 17 which overhangs and is supported by the ledges 13 of the supports.

One of the fundamental objects of this invention is to provide a device that may not be overturned by the stock feeding therefrom. I have, therefore, fixedly and permanently anchored the supports to the floor or ground 18, as by means of bolts or studs 19 or the like. I have also provided means for detachably securing the tank to the several supports, this last means comprising staples 20 fixedly attached to and upstanding from the ledges 13 of the supports. The staples are received within registering slots 21 formed in the overhanging lips 17 of the tank and a portion thereof projects substantially above the mentioned lips of the tank to receive the ends of the bars 22. By reason of the fact that each of the ledges of the supports carries a staple 20, the staples will be arranged in pairs at spaced intervals along the length of the tank and the staples of each pair will be disposed in transversely aligning relation with each other. The end 23 of each bar is formed with a laterally offset head portion which prevents axial movement of the bar in a direction to draw the head through the adjacent staple. The opposite end of the bar extends through and beyond the staple located at the side of the tank remote from the head 23 and the portion thereof extending beyond the staple is provided with an opening for receiving a spring catch 24 or the like. While I have here illustrated a spring catch as being used to hold the bars against displacement, it is to be understood that a padlock, stud bolt or any other suitable means may be used.

If the trough is to be used for the feeding of hogs it is necessary that some means be provided for separating the animals and for preventing the same from climbing bodily into the tank. Therefore, when the device is being used for this purpose, I provide a removable guard frame 25 which is of generally rectangular formation in plan and is of a length substantially equal to the length of the tank. The guard frame is formed at each side and at one end thereof with a depending lip or flange 26, the side flanges of which extend along the outer side of the vertical legs 14 of the supports and the end flange of which overlaps the upper marginal edge of the adjacent end of the tank. The rectangular frame 25 is divided into equal spaces 27 by the transversely extending bars or partitions 28. Each of the spaces 27 is of sufficient width to permit a hog to insert its head between the adjacent bars or partitions in eating from the tank but the adjacent bars are spaced sufficiently close together to prevent the animal from climbing bodily therein. When the guard frame is used, the horizontal flange 29 of the regular main frame 25 lies flatly against the lip 17 of the tank so that the openings 30 receive the upstanding staples 20. The bars 22 are then inserted in the portion of the staples projecting above the guard frame.

It may thus be seen that the animals feeding from the tank may not upset the same by reason of the fact that the supports 11 are fixedly attached to the ground or to the floor of the building in which the trough is situated and by reason of the fact that the tank is, in turn, fixedly but detachably secured to the supports by the rods 22. Removal of the catches 24 will permit the bars to be slipped through the staples whereby the guard frame, if used, may be lifted vertically and removed from the tank. If desired, the tank itself may then be lifted from the supports. However, inasmuch as the tank is preferably formed from galvanized metal or the like, it is extremely heavy and I have, therefore, provided one of the end supports 11 with horizontally extending tabs 31 which extend from the ledges 13 and below the overhanging lip 17 of the tank. Pins 32, fixedly attached to the lip of the tank, extend downwardly through elongated slots 33 in the tabs, which pins are restricted in their movements relative to the support to within limits defined by the length of the slots 33.

As clearly illustrated in the drawings, the end 34 of the tank extending beyond the tabs 31 is spherically curved. The opposite end 35 of the tank is formed with a vertical end wall and if this end of the tank is moved upwardly to tilt the tank to the position illustrated by the dotted lines in Figure 5, a stream of water may be directed into the tank to cleanse the interior of the same, which water is then permitted to flow by gravity from the lower curved end of the tank. When the tank is in the tilted position it will be prevented from sliding from the support by engagement of the pins 32 within the slots 33 and when the tank is again lowered to the horizontal position the pin and slot connection will reposition the openings 30 in the extending lip thereof in alignment with the upstanding staples of the supports.

In order that the tank may be held in the tilted position, I have provided a bail 36 which normally extends below the tank and has its opposite ends pivotally attached at opposite sides of the tank directly below the overhanging lip thereof. Thus, when the tank is tilted the bail will automatically swing downwardly and wedge itself against the ground or against the surface of the floor on which the supports are mounted. Positioning of the bail in this manner will hold the tank in the tilted position until the cleansing operation is completed at which time the end 35 of the tank may be lifted slightly to release the bail and the tank again lowered to the horizontal position.

It may thus be seen that when the bars 22 are placed in locking relation with the tank, the tank will be fixedly associated with the supports and that when it is desired to cleanse the tank it is only necessary to remove the bars and tilt the tank. This operation may be easily and expeditiously accomplished and may be readily performed by a single person.

While the bars 28 prevent large hogs from climbing into the tank, I find that pigs or shoats do climb therein and step across the bars 28, as well as lie across the same, with their feet within the tank, thus the shoats not only prevent the large hogs from using the trough, but they cause the water or swill therein to become muddy or otherwise dirty, so that the hogs will not drink the same. In order to overcome that condition, I provide upwardly bowed guard strips 37, terminating in ears 38 that are riveted or otherwise fixed to the upper faces of the ends of the bars 28 by the same means that secure the bars to the horizontal flange 29 of the guard frame 25 there being a strip 37 overlying each bar, and while I have shown the strips as being bowed in semicircular formation, they may be of semi-oval shape or inverted V-shape.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. A trough of the character described, comprising a stationary supporting structure having laterally spaced ledges, an open tank between said ledges with lateral flanges resting thereon, a guard frame formed with side rails resting on the flanges of the tank, oppositely arranged staples carried by the ledges and passing upwardly through the flanges carried by the tank and the side rails of the guard frame, and transverse bars removably secured in the staples and adapted to hold the guard frame and the tank on the ledges and means carried by the supporting structure on which the tank may be rocked when the bars are removed.

2. A trough of the character described, comprising a stationary supporting structure with lateral spaced side ledges, an open tank between said ledges with lateral flanges resting thereon, a guard frame having side rails resting upon the flanges of the tank, the flanges of the tank and side rails of the guard frame having registering openings, oppositely arranged staples carried by the ledges of the supporting structure and passing through the openings in the tank flanges and the side rails of the guard frame, and transverse bars loosely passing through the staples and held against longitudinal movement, whereby the guard frame and the tank are held on the side ledges of the supporting structure.

OTIS P. CRIM.